United States Patent [19]
Ishizu et al.

[11] Patent Number: 5,168,358
[45] Date of Patent: Dec. 1, 1992

[54] VIDEO SIGNAL CONVERTING APPARATUS FOR CONVERTING HDTV SIGNAL INTO CONVENTIONAL TV SIGNAL

[75] Inventors: Atsushi Ishizu, Takatsuki; Yoshio Seki, Osaka; Masaki Tokoi, Neyagawa, all of Japan

[73] Assignee: Matsushita Electric Industrial Co., Ltd., Osaka, Japan

[21] Appl. No.: 712,034

[22] Filed: Jun. 7, 1991

[30] Foreign Application Priority Data

Jun. 7, 1990 [JP] Japan .................................. 2-148987
Nov. 27, 1990 [JP] Japan .................................. 2-328707

[51] Int. Cl.⁵ .................................................. H04N 7/01
[52] U.S. Cl. ........................................ 358/140; 358/11
[58] Field of Search ................. 358/140, 11, 166, 138, 358/133, 141

[56] References Cited

U.S. PATENT DOCUMENTS

| | | | |
|---|---|---|---|
| 4,791,487 | 12/1988 | Kozuki et al. ..................... | 358/140 |
| 4,967,271 | 10/1990 | Campbell et al. ............... | 358/140 X |
| 4,989,090 | 1/1991 | Campbell et al. ................ | 358/11 X |
| 5,001,563 | 3/1991 | Doyle et al. ......................... | 358/140 |

OTHER PUBLICATIONS

"MUSE/NTSC Converter", Masami Itoga et al., IEEE Transactions on Consumer Electronics, vol. 35, No. 3, Aug. 1989, pp. 142-151.
"MUSE/NTSC Converter", Hiroshi Ito et al., ITEJ Technical Report, vol. 14, No. 8, pp. 13-18, Jan. 1990.

*Primary Examiner*—Victor R. Kostak
*Attorney, Agent, or Firm*—Wenderoth, Lind & Ponack

[57] ABSTRACT

A video signal converting apparatus includes: an interpolating circuit for interpolating a non-sampling point from sampling points in a field for restoring an HDTV band-compressed by offset sub-sampling; a first delay element for delaying the interpolated signal by one field period and a second delay element for delaying an output of the first delay element by one field; a median-value selector for selecting a median-value signal from signals in three adjacent fields from the input and output of the two delay elements, and an adder for averaging the output of the first delay element and an output of the median-value selector. Alternatively, the first and second delay elements maybe disposed before the interpolating circuit rather than after the interpolating circuit. Furthermore, a time-access conversion circuit maybe disposed either before the interpolating circuit or after the adder.

10 Claims, 10 Drawing Sheets

AVERAGE WITH PRECEDING FIELD

AVERAGE WITH SUCCEEDING FIELD

PRESENT FIELD

VIDEO SIGNAL CONVERTING APPARATUS FOR CONVERTING HDTV SIGNAL INTO CONVENTIONAL TV SIGNAL

BACKGROUND OF THE INVENTION

1. Field of the Invention

The present invention relates to a video signal converting apparatus for decoding a high definition television signal being transmitted in band-width compression by employing the sub-Nyquist sampling method, and for converting it into a conventional standard television signal.

2. Description of the Prior Art

A high definition television signal has a band-width of 20 MHz or more, so that it is necessary to compress the band when transmitting such a signal through a direct broadcasting satellite or the like. As the effective technology for greatly compressing the band-width of a high definition television signal, the method of compressing the signal band by sub-Nyquist sampling is known, and the MUSE (Multiple Sub-Nyquist sampling encoding) method, and the HD-MAC (High Definition - Multiple Analogue Component) method have been proposed.

(See, for example, Nrnomiya et al., "Satellite one-channel transmission method of high definition television (MUSE)," Television Academic Society Technical Report TEBS95-2, pages 37 to 42, F.W.P. Vreeswijk et al., "HD-MAC Coding for Compatible Broadcasting of HDTV Signals," Symposium record Broadcast Session 1989, pp. 37-53.)

These methods are, as shown in FIG. 9, perform offset sub-sampling between fields and between frames, and of the sampling points of the original signal, ¼ of the sampling points are transmitted, and a complete picture is transmitted in four fields, and the band-width of the original signal is compressed to ¼. At the receiving side, from the transmitted sampling points, non-transmitted sampling points (non-sampling points) are obtained by interpolation, and the original signal is restored. For example, in the stationary area, all sampling points of the present field and the past three fields are used in interpolation. In the moving area, only the sampling points in the transmitted field are interpolated.

Thus, the method of interpolation differs between the stationary area and moving area, and the interpolation method is changed over by detecting the motion of the picture.

By such processing at the transmission side and reception side, high definition television broadcast can be enjoyed. However, the signal processing circuit (i.e., decoder) at the receiving side is very expensive, and it will take a very long time until it is widely adopted for household use. It is accordingly considered to use the television and VCR of the conventional standard method presently used widely at home, but in such a case, it is impossible to display and record in the high definition television signal state, and it is necessary to convert the high definition television signal into conventional television signal by using a standard converter.

Hitherto, a video signal converter has been disclosed, for example, in "MUSE/NTSC Converter," IEEE Trans. CE-35,3, pp. 142 to 152.

In such an existing video signal converter, when interpolating in order to restore the band-compressed signal by offset sub-sampling, only the intra-field interpolation corresponding to the moving area processing by the decoder is performed from the viewpoint of the circuit scale and the cost, the signal transmission characteristics will be as shown in the frequency characteristics in FIG. 10 (a), and in the stationary area, the high resolution components of the high definition television signal by the offset sampling of the MUSE system as shown in the frequency characteristics in FIG. 10 (b) are left over as the aliasing components in the converted conventional standard television signal, which results in deterioration of the picture quality.

SUMMARY OF THE INVENTION

It is hence a primary object of the invention to present a video signal converting apparatus capable of enhancing the picture quality of the converted conventional standard television signal, by performing the interpolation for restoring the band-compressed high definition television signal by offset sub-sampling between fields or between frames, only in a field, thereby eliminating the remaining aliasing components.

To achieve the above object, the invention provides a video signal converting apparatus comprising an interpolating circuit for interpolating a non-sampling point from sampling points within a field in order to restore a high definition television signal band-compressed by offset sub-sampling, a first delay element for delaying the interpolated signal by one field period, a second delay element for delaying an output of the first delay element further by one field period, a median-value signal selector for selecting a median-value signal of signals in three adjacent fields from the input and output of the two delay elements, and an adder for calculating a mean value of the output of the first delay element and an output of the median-value selector.

In this configuration, the television signal interpolated in the field is supplied into the two delay elements in one field period, and a median-value signal in three adjacent fields is obtained, and is averaged with the present field signal, and hence a mean value signal of either the adjacent front or rear correlated fields is obtained, so that the aliasing components derived from the offset sub-sampling between fields can be reduced.

DESCRIPTION OF THE PREFERRED EMBODIMENTS

Figure 1:
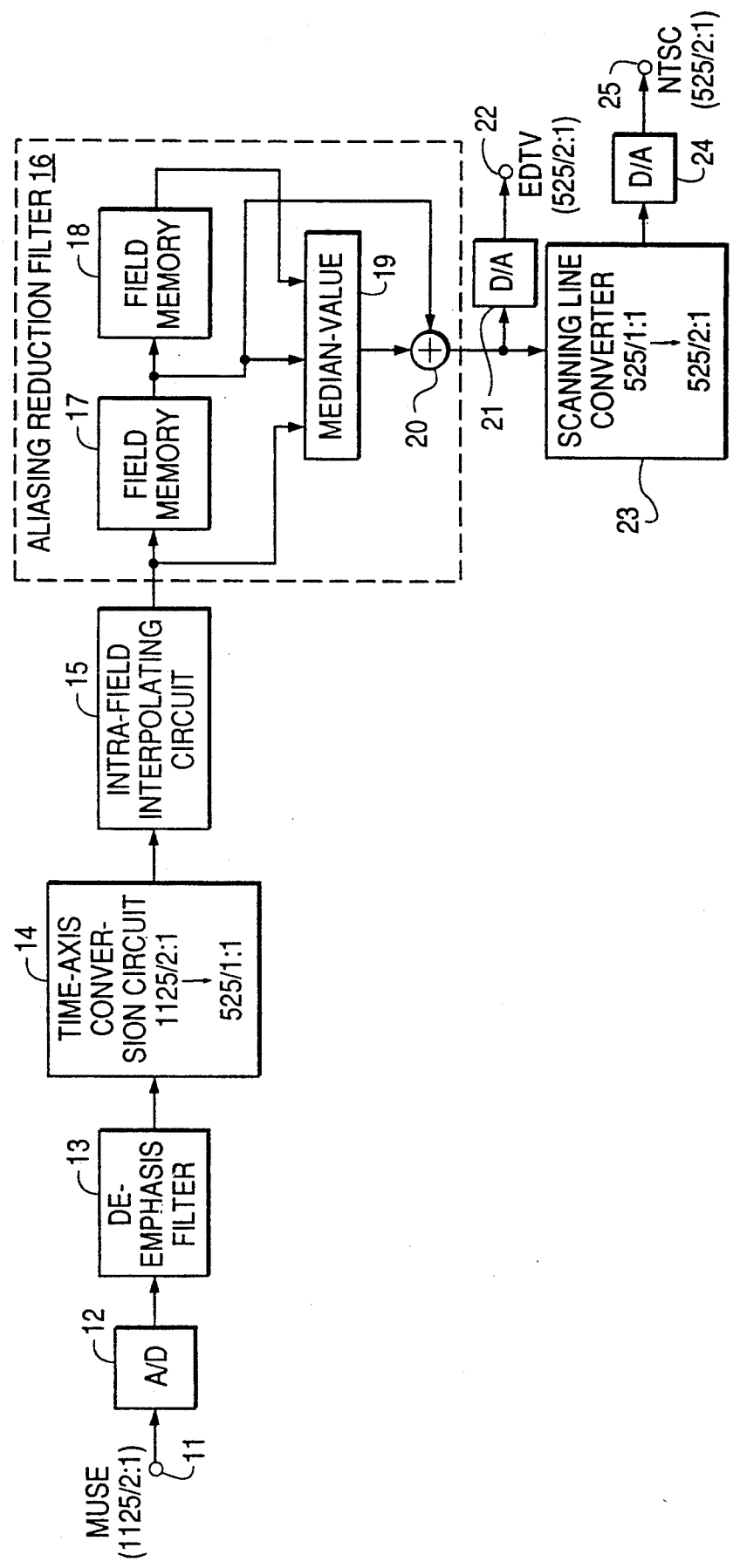
FIG. 1 is a block diagram of a video signal converter in accordance with an embodiment of the present invention.

FIG. 1 is a block diagram of a video signal converter in accordance with an embodiment of the present invention. In FIG. 1, element 11 is an input terminal for feeding a high definition television signal (hereinafter referred to as a MUSE signal) band-compressed by offset sub-sampling; element 12 is an A/D (analog-to-digital) converter for converting the analog MUSE signal fed in the input terminal 11 into a digital signal; element 13 is a de-emphasis filter for restoring the nonlinear emphasis characteristics applied at the time of transmission by frequency-modulating the MUSE signal; element 14 is a time-axis conversion circuit for converting the high definition television signal into a standard television signal of progressive scanning; element 15 is an interpolating circuit for interpolating the non-sampling point for restoring the band-compressed signal; element 16 is an aliasing reduction filter for removing undesired high resolution components in the high definition television signal remaining in the converted standard television signal; element 21 is a D/A (digital-to-analog) converter for converting the converted digital standard television signal of progressive scanning into an analog signal, and element 22 is an output terminal for outputting the standard television signal of progressive scanning. Elements 17 and 18 are field memories; element 19 is a median-value signal selector for selecting a median-value signal of signals in three adjacent fields, and element 20 is an adder. Furthermore, element 23 is a scanning line converter for thinning the scanning lines from the television signals of progressive scanning into television signals of interlace scanning; element 24 is a D/A converter for converting the digital standard television signal of interlace scanning into an analog signal, and element 25 is an output terminal for outputting the standard television signal of interlace scanning.

In thus composed video signal converter of this embodiment, the operation is described below.

The analog MUSE signal entering the input terminal 11 is converted into a digital signal in the A/D converter 12. The digital MUSE signal is supplied into the de-emphasis filter 13. In the de-emphasis filter 13, the nonlinear emphasis characteristics applied at the time of transmission by frequency modulation of the MUSE signal is returned to the initial state. However, when the MUSE signal is transmitted by amplitude modulation, the de-emphasis filter 13 is bypassed. In consequence, in the time-axis conversion circuit 14, the number of scanning lines is converted in order to convert the high definition television signal into the standard television signal of progressive scanning, and the non-sampling point is interpolated from the sampling points in the field in order to restore the band-compressed signal in the interpolating circuit 15, thereby obtaining a standard television signal of progressive scanning. The standard television signal of progressive scanning is entered into the aliasing reduction filter 16, and the undesired high resolution components (aliasing components derived from offset sub-sampling between fields) of the high definition television signal that cannot be displayed in the conventional standard television receiver are removed by the aliasing reduction filter 16. The signal being rid of the aliasing components is converted into an analog signal in the D/A converter 21, and is delivered as a standard television signal of progressive scanning from the output terminal 22. The standard television signal of progressive scanning delivered from the aliasing reduction filter 16 is fed into the scanning line converter 23 where the scanning lines are separated from the television signal of progressive scanning into a television signal of interlace scanning, and after it is converted into an analog signal in the D/A converter 24, it is delivered as the standard television signal of interlace scanning from the output terminal 25.

To remove the aliasing components due to offset sub-sampling between fields, it is enough to obtain the sum of the fields, but it is limited to the stationary area. In the moving area, since the pre-filter of the intra-field interpolation is preliminarily applied, aliasing components are not formed, and when the sum is taken in the fields in the moving area, the picture quality deteriorates. Therefore, detecting the motion of the image, in the moving area, the signal of the present field is used, and in the stationary area, the mean signal of the present field and the previous field is used. For this purpose the motion adaptive control is necessary. This motion adaptive control, however, makes the structure complicated, and if an error occurs in the motion detection, the picture quality significantly deteriorates.

In this embodiment, accordingly, the aliasing reduction filter 16 for removing the aliasing components by offset sub-sampling between fields is basically composed of two field memories 17 and 18 in cascade connection for storing the interpolated standard television signal of progressive scanning, a median-value selector 19 for selecting the median-value signal of the signals in three adjacent fields from the input and output of the two field memories 17 and 18, and an adder 20 for obtaining the sum of the output of the field memory 17 and the output signal of the median-value selector 19, thereby realizing elimination of aliasing components without requiring detection of motion.

Figure 2:
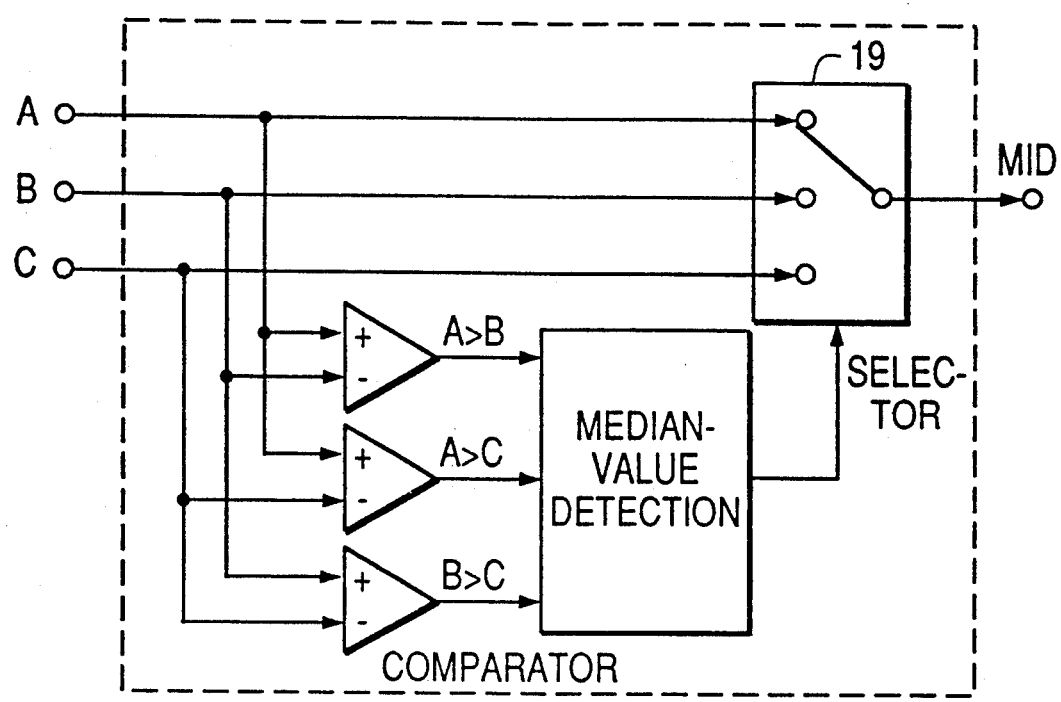
FIG. 2 is a block diagram of a median-value signal selector in the same embodiment.

Meanwhile, the median-value selector 19 detects the signal, as shown in FIG. 2, which is the median value in amplitude by comparing the magnitude of each pair of the three input signals, and delivers the median-value signal by changing over the means of selection depending on the result of the detection.

The median-value selector 19, however, is not limited to the one shown in FIG. 2, and any other configuration may be possible as long as it is designed to select a median-value. The logic table of median-value selection in the median-value selector 19 is shown in the table below.

| Magnitude relationship (ascending order) | | | Comparator output | | | Selection signal |
|---|---|---|---|---|---|---|
| A | B | C | A > B | A > C | B > C | MID |
| 2 | 1 | 3 | 0 | 1 | 1 | A |
| 2 | 3 | 1 | 1 | 0 | 0 | A |
| 1 | 2 | 3 | 1 | 1 | 1 | B |
| 3 | 2 | 1 | 0 | 0 | 0 | B |
| 1 | 3 | 2 | 1 | 1 | 0 | C |

-continued

| Magnitude relationship (ascending order) | | | Comparator output | | | Selection signal |
| --- | --- | --- | --- | --- | --- | --- |
| A | B | C | A > B | A > C | B > C | MID |
| 3 | 1 | 2 | 0 | 0 | 1 | C |
| 1 | 1 | 2 | 1 | 1 | 1 | B |
| 2 | 2 | 1 | 1 | 0 | 0 | A |
| 1 | 2 | 1 | 1 | 1 | 0 | C |
| 2 | 1 | 2 | 0 | 1 | 1 | A |
| 2 | 1 | 1 | 0 | 0 | 1 | C |
| 1 | 2 | 2 | 1 | 1 | 1 | B |
| 1 | 1 | 1 | 1 | 1 | 1 | B |

Figure 3A:
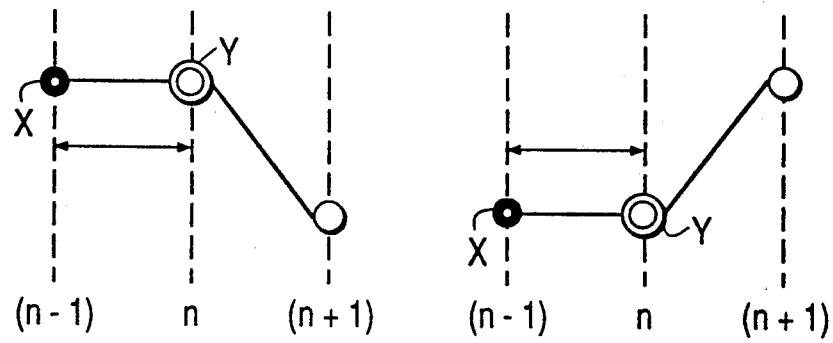
FIGS. 3(a)-3(c) are signal waveform diagram for explaining the operation for eliminating the aliasing components in the same embodiment.
Figure 3B:
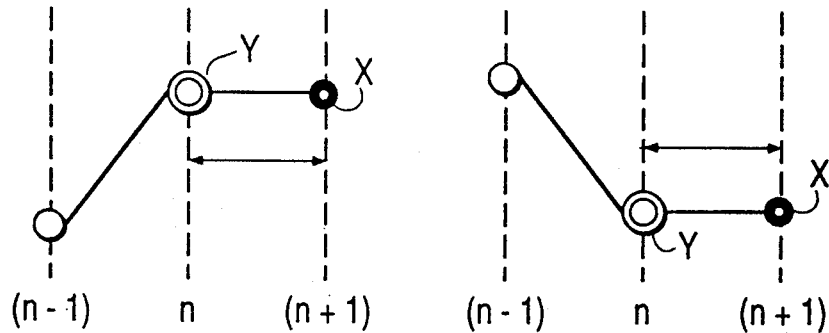
Figure 3C:
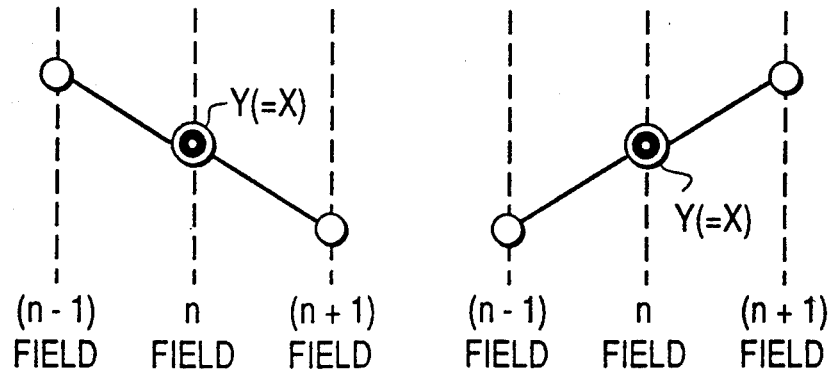

Referring now to FIGS. 3(a)-3(c) the operation of the aliasing reduction filter 16 is explained below. FIGS. 3(a)-3(c) are examples of signal waveforms for explaining the action of removing the aliasing distortion.

In the stationary area without motion of the input television signal or in the motion changing point, as shown in FIGS. 3(a) or 3(b), the median-value signal X (indicated by . in the drawing) selected by the median-value selector 19 becomes either the front or rear signal, and as it is averaged with the signal Y of the present field (indicated by o in the drawing) and the adder 20, the sum of the fields is obtained, so that the aliasing components by the offset sub-sampling between fields are removed. On the other hand in the moving area in which the input television signal moves, as shown in FIG. 3 (c), the median-value signal selected by the median-value selector 19 becomes the signal Y of the present field, and therefore the signal of the present field itself is obtained, and the picture quality does not deteriorate.

Thus, according to the embodiment, after interpolation of the high definition television signal band-compressed by offset sub-sampling in the field, the aliasing distortion derived from the offset sub-sampling between fields can be reduced sufficiently in the aliasing reduction filter 16, by installing the median-value selector 19 for selecting the median-value signal of the signals in three adjacent fields obtained from the field memories 17 and 18 and the adder 20 so as to obtain the mean signal of the correlated signals between fields.

Besides, since the filter characteristics is not changed over adaptively by detecting the motion, the picture quality does not deteriorate due to error in motion detection, and a simple circuit composition is realized.

Figure 4:
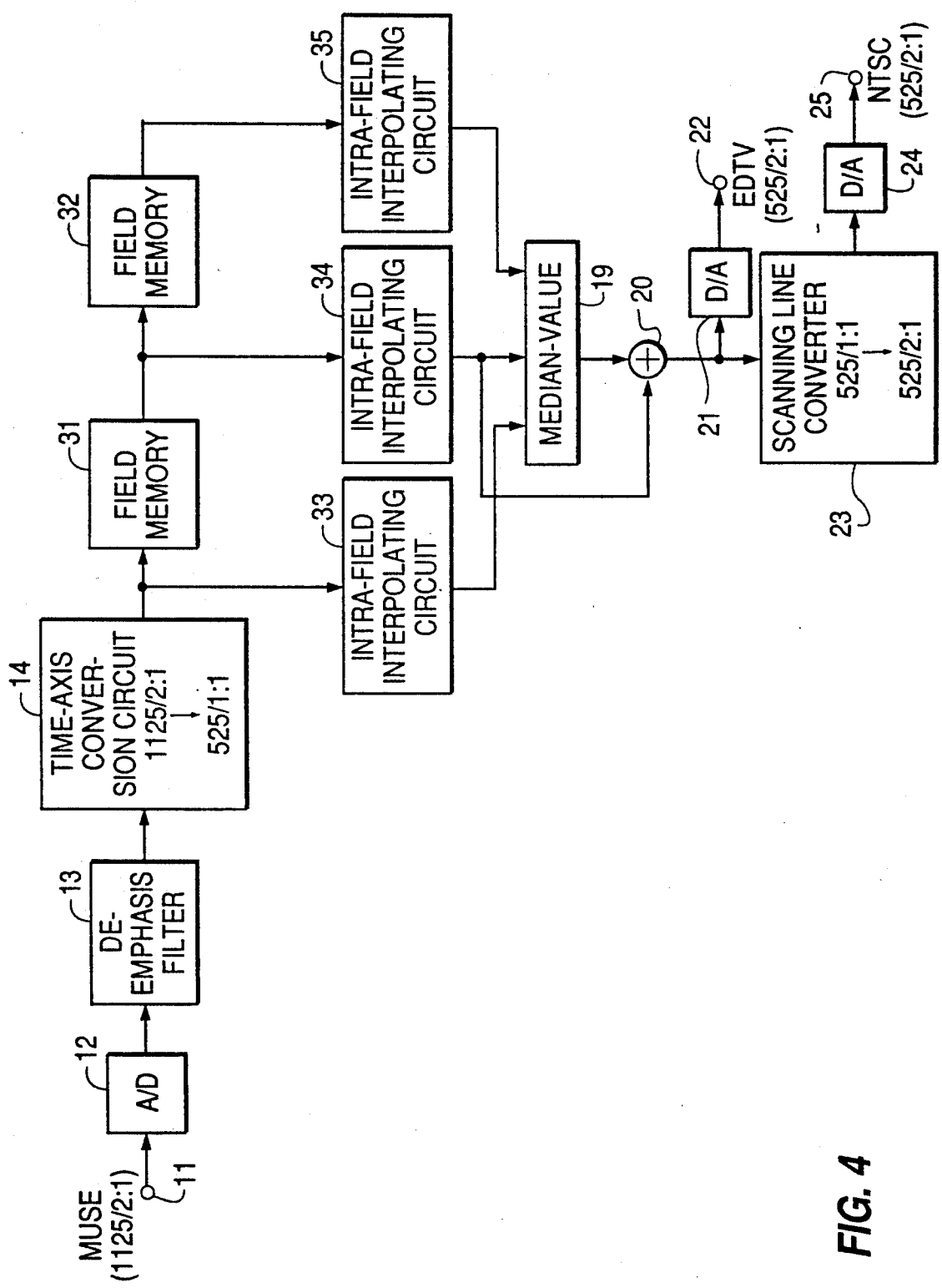
FIG. 4 is a block diagram of a video signal converter of another configuration in accordance with the same embodiment.

FIG. 4 is a block diagram of another example of the video signal converter. The components identical in purpose and function to those shown in the embodiment shown in FIG. 1 are identified with the same reference numbers and are not explained particularly herein. What is different from FIG. 1 is that the field memories are disposed before the interpolating circuit 15.

It is exactly the same until the MUSE signal entering the input terminal 11 is converted in the number of scanning lines in the time-axis conversion circuit 14 in order to convert the high definition television signal into the standard television signal of progressive scanning. Sequentially, the signal is stored in two field memories 31 and 32 in cascade connection, and the non-sampling point is interpolated from the sampling points in the field with respect to the band-compressed signals three adjacent fields in the interpolating circuits 33, 34, and 35 having in the same configuration as the interpolating circuit 15. The aliasing components are eliminated by averaging the mutually correlated signals between fields in the median-value selector 19 for selecting the median-value signal from the signals in the adjacent fields and the adder 20, and after being converted into an analog signal in the D/A converter 21, it is delivered as the standard television signal of progressive scanning from the output terminal 22. The standard television signal of progressive scanning is fed into the scanning line converter 23 to be separated in the number of scanning lines from the television signal of progressive scanning into the standard television signal of interlace scanning, and it is converted into an analog signal in the D/A converter 24, and is delivered as the standard television signal of interlace scanning from the output terminal 25.

In this way, by installing the field memories for obtaining the signals of three adjacent fields in such a manner as to store the television signals before interpolation, the aliasing distortion due to offset sub-sampling between fields by MUSE system can be sufficiently reduced, and since the signals are stored before the amount of data doubles by interpolation, the capacity of the field memories may be reduced by half.

Figure 11A:
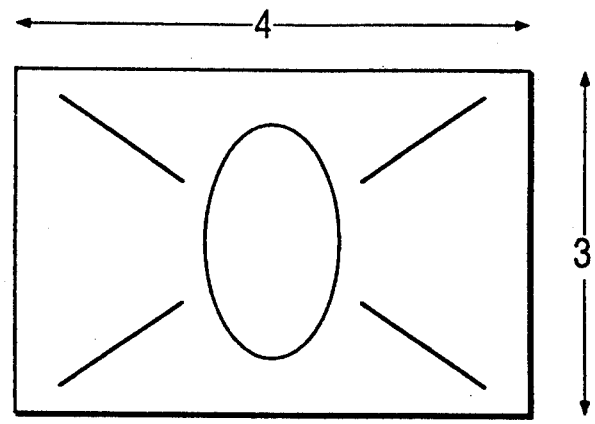
FIGS. 11(a)–11(c) are screen drawings for explaining the display form of television signal.
Figure 11B:
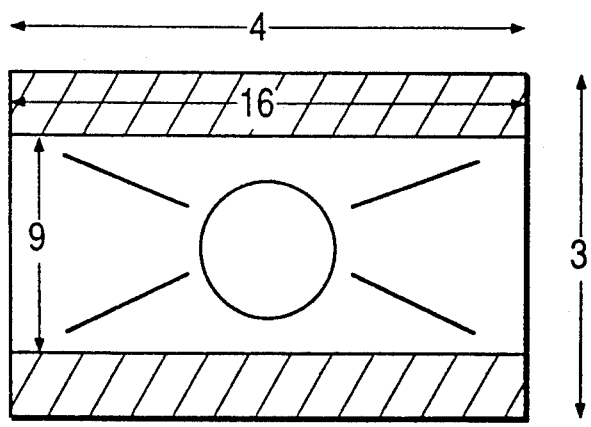
Figure 11C:
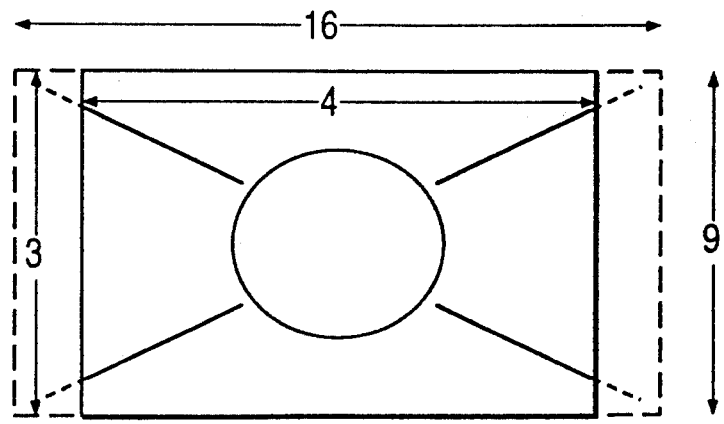

In the video signal converter in the embodiment shown in FIGS. 1 and 4, since the high definition television signal having an aspect ratio of 16:9 is converted into the standard television signal with an aspect ratio of 4:3, the image is oblong compressed in the horizontal direction as shown in FIG. 11 (a), and to convert it into a type called a letterbox display as shown in FIG. 11 (b), it is necessary to change the aspect ratio to compress the image in the vertical direction. Here, in the time-axis conversion circuit for converting the high definition television signal into the standard television signal, another embodiment of the present invention for simultaneously converting the number of scanning lines and the aspect ratio so as to save the circuit scale is explained below.

Figure 5:
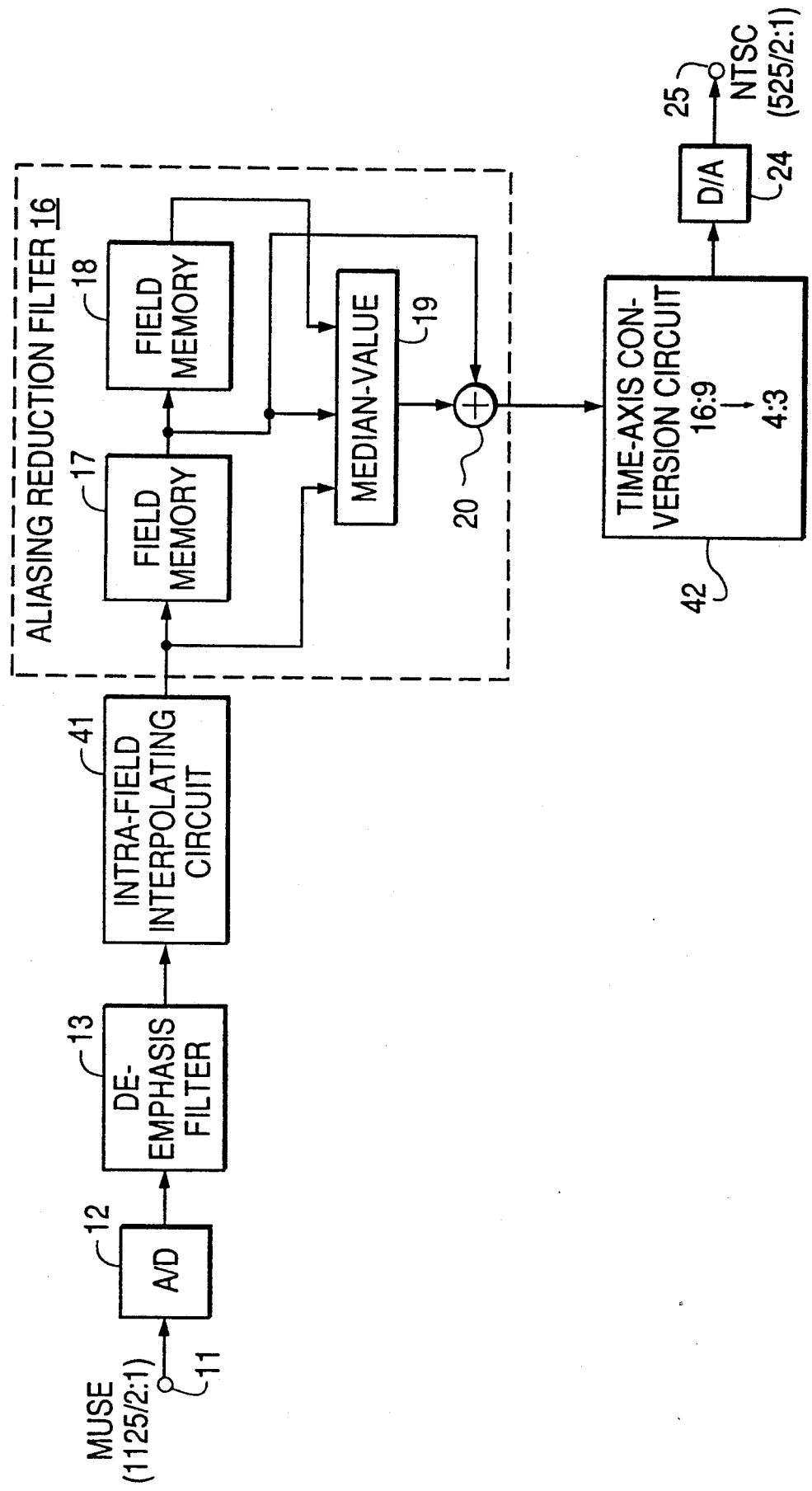
FIG. 5 is a block diagram of a video signal converter in accordance with another embodiment of the present invention.

FIG. 5 is a block diagram of a video signal converter in accordance with still another embodiment of the present invention. In the diagram, as in FIG. 4, the parts corresponding to those in FIG. 1 are identified with the same reference numbers. In FIG. 5, element 11 is an input terminal for receiving a MUSE signal; element 12 is an A/D converter for converting the analog MUSE signal input to the input terminal 11 into a digital signal; element 13 is a de-emphasis filter for restoring the non-linear emphasis characteristics applied at the time of transmission by frequency modulation of the MUSE signal; element 41 is an interpolating circuit for interpolating the non-sampling point from the sampling points in the field for restoring the band-compressed signal; element 16 is an aliasing reduction filter for removing the undesired high resolution components of high definition television signal left over in the converted standard television signal; element 42 is a time axis conversion circuit for converting the high definition television signal being rid of the aliasing distortion into the standard television signal while the aspect ratio is converted; element 24 is a D/A converter for converting the converted digital standard television signal into an analog signal, and element 25 is an output terminal for outputting the standard television signal. Besides, elements 17 and 18 are field memories; element 19 is a median-value selector for selecting the median-value of the signals in three adjacent fields, and element 20 is an adder.

The operation of the thus composed video signal converter is described below.

The analog MUSE signal fed in the input terminal 11 is converted into a digital signal in the A/D converter 12. The MUSE signal converted into the digital signal is supplied to the de-emphasis filter 13. In the de-emphasis filter 13, the nonlinear emphasis characteristics applied at the time of transmission by frequency modulation of MUSE signal is returned to the original state. However, in the case of transmission of the MUSE signal by amplitude modulation, the filter 13 is bypassed. Next, in order to restore the signal band-compressed in the interpolating circuit 41, after interpolation of the non-sampling point from the sampling point in the field, the signal is fed into the aliasing reduction filter 16, and the undesired high resolution components (the aliasing components due to offset sub-sampling between fields) of the high definition television signal that cannot be displayed in the conventional standard television receiver are removed by the aliasing reduction filter 16. The signal being rid of the aliasing components is converted from the high definition television signal into the conventional standard television signal in the time-axis conversion circuit 42, while the aspect ratio is converted, and it is converted into analog signal in the D/A converter 24 as a luminance signal and two color difference signals, and is delivered from the output terminal 25 as the standard television signal.

Figure 6:
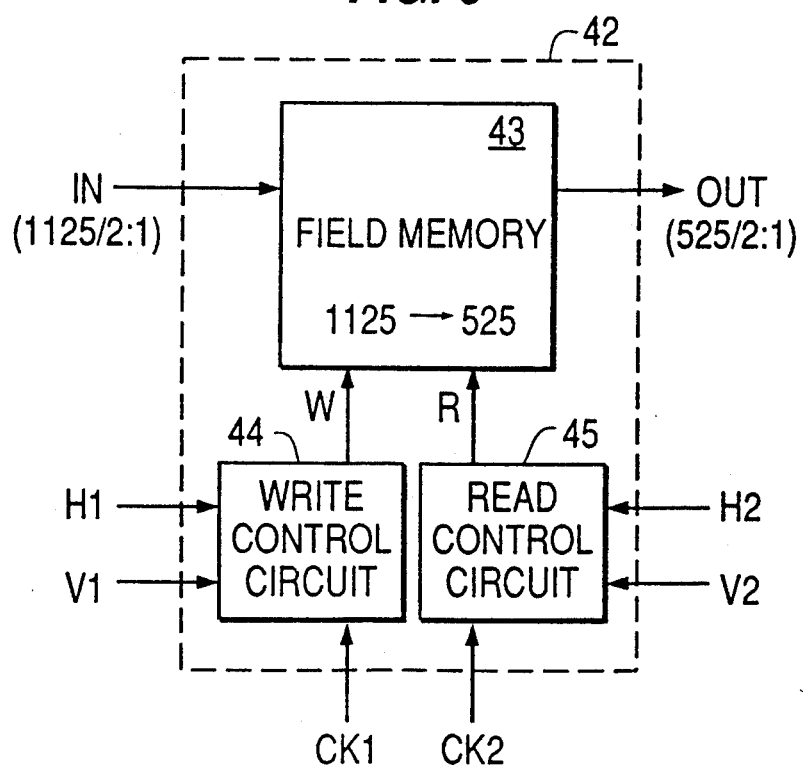
FIG. 6 is a block diagram of a time-axis conversion circuit in the same embodiment.

The time-axis conversion circuit 42 is composed of, as shown in FIG. 6, a field memory 43 capable of writing and reading asynchronously, a write control circuit 44, and a read control circuit 45.

Figure 7A:
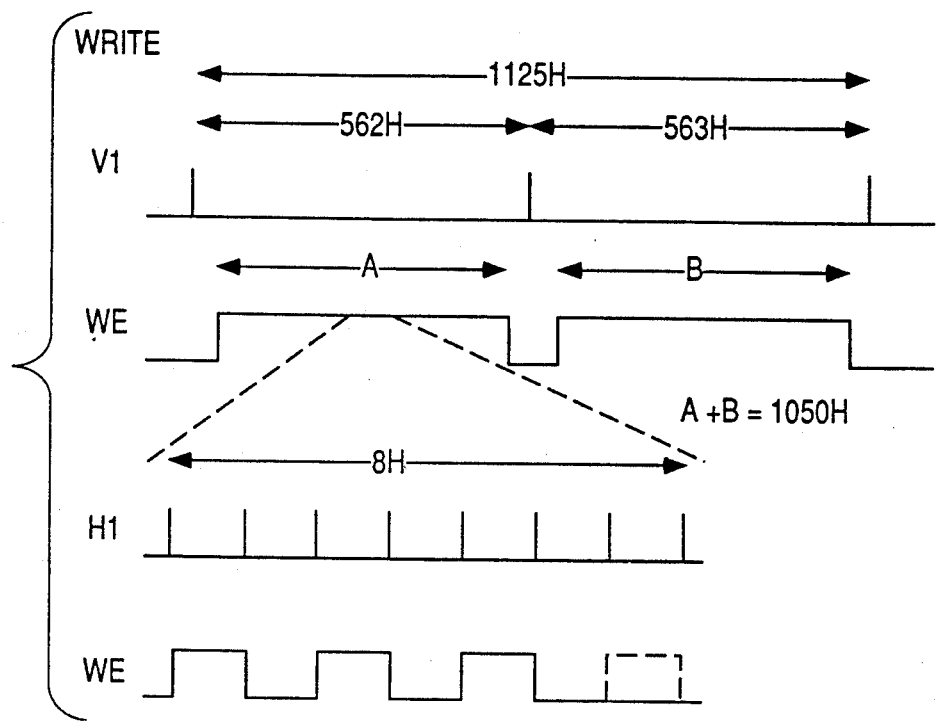
FIGS. 7(a)-7(b) are timing charts showing the control signal relationship in the time-axis conversion circuit shown in FIG. 6.
Figure 7B:
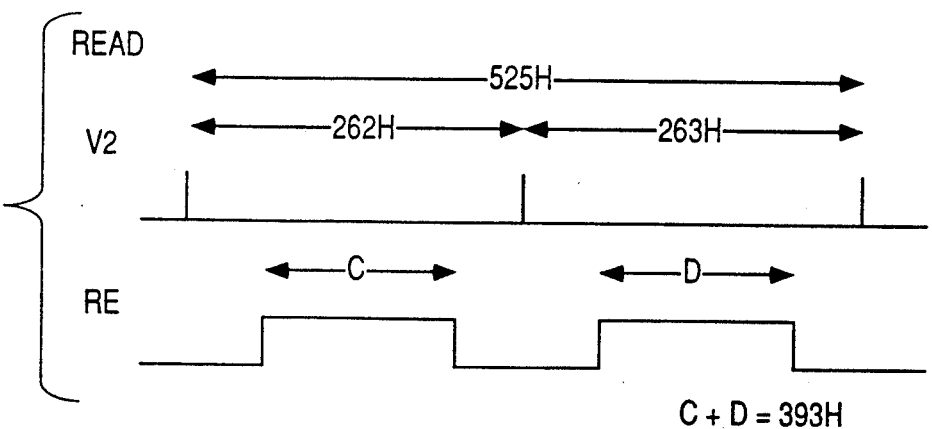

In the write control circuit 44, on the basis of the horizontal, vertical synchronous signals H1 and V1 of the high definition television signal, a write enable control signal WE is generated as shown in FIG. 7 (a), and 1050 lines out of 1125 scanning lines of the high definition television signal are cut out, and the television signal is stored in clock CK1 so as to thin out the 1050 scanning lines by ½. When directly read out as the standard television signal, it is displayed as an oblong image as shown in FIG. 11 (a), and therefore considering the difference in the aspect ratio, the scanning lines are further thinned out to ¾ times, that is, thinning 1 out of 4, to 393 scanning lines. In the read control circuit 45, on the basis of the horizontal, vertical synchronizing signals H2 and V2 of the standard television signal, a read enable control signal RE is generated as shown in FIG. 7 (b), and by reading out the television signal from the field memory 43 by clock CK2, the entire high definition television signal of the aspect ratio of 16:9 can be displayed in the screen of the standard television receiver with the aspect ratio of 4:3 as shown in FIG. 11 (b), and the high definition television signal can be converted into the standard television signal, while the aspect ratio can be converted at the same time.

In this time-axis conversion circuit for converting the high definition signal into the conventional standard television signal, by simultaneously converting the number of scanning lines and the aspect ratio, the circuit scale can be reduced.

In the time-axis conversion circuit 42, after converting to 525 scanning lines by cutting out 1050 out of 1125 lines, the number of scanning lines is further converted to ¾ times to obtain the image as shown in FIG. 11 (b), but keeping 525 scanning lines, when the write enable control signal WE is generated so as to discard the both ends of the television signal in the horizontal synchronizing direction, and the read enable control signal RE is generated so as to read out all 525 scanning lines from the field memory 43, it is also possible to display an image cutting of the both ends of the high definition television signal with aspect ratio of 16:9 in the screen of the standard television receiver with the aspect ratio of 4:3 as shown in FIG. 11 (c).

It is also possible to convert the high definition television signal into the standard television signal of progressive scanning by directly converting 1050 scanning lines to ¾ times without ½ thinning and storing the television signal into the field memory 43, generating read enable control signal RE on the basis of the horizontal and vertical synchronizing signals H2 and V2 of the standard television signal of progressive scanning, and reading out the television signal from the field memory 43.

Figure 8:
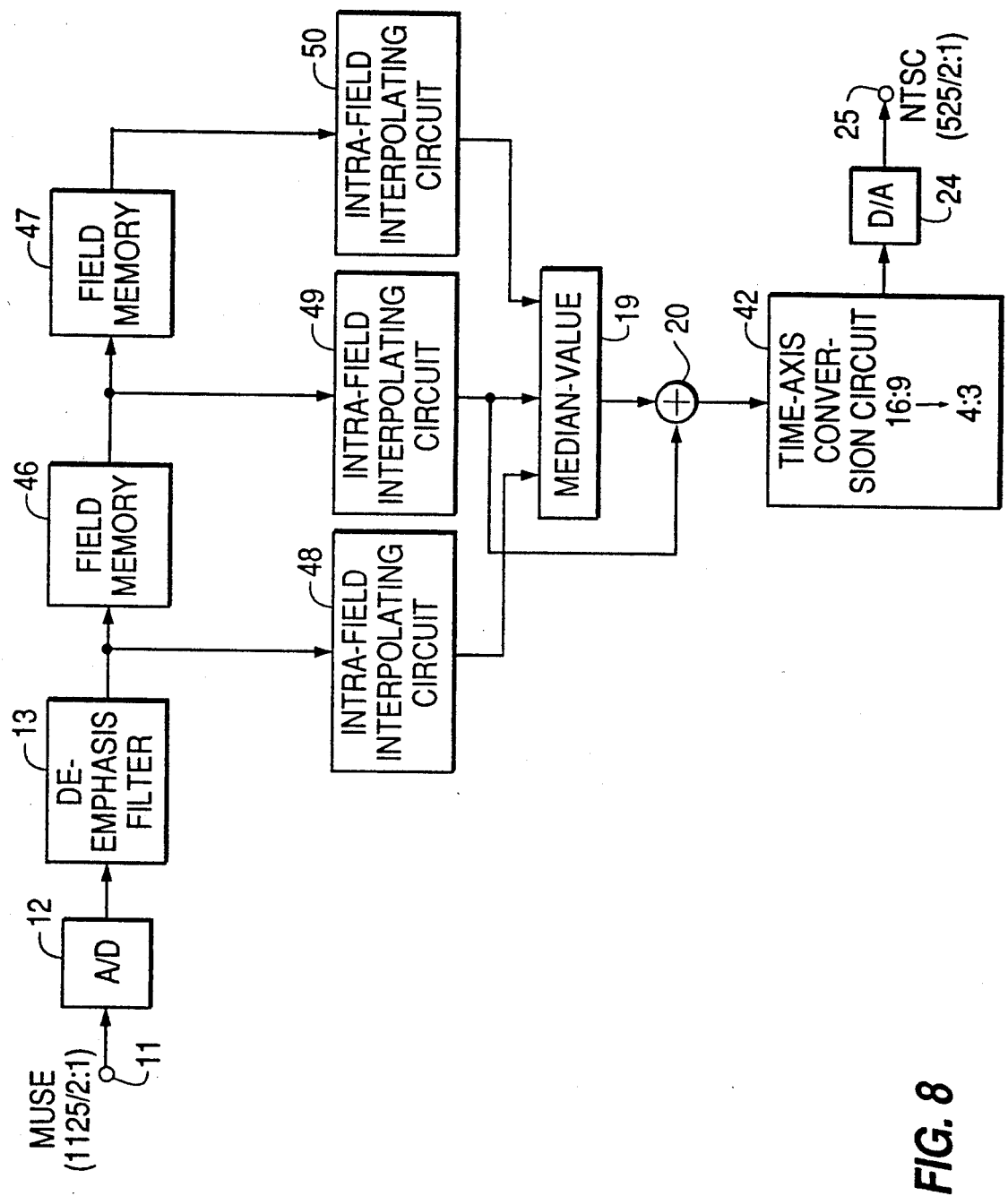
FIG. 8 is a block diagram of a video signal converter of another configuration in accordance with the same embodiment.
Figure 9:
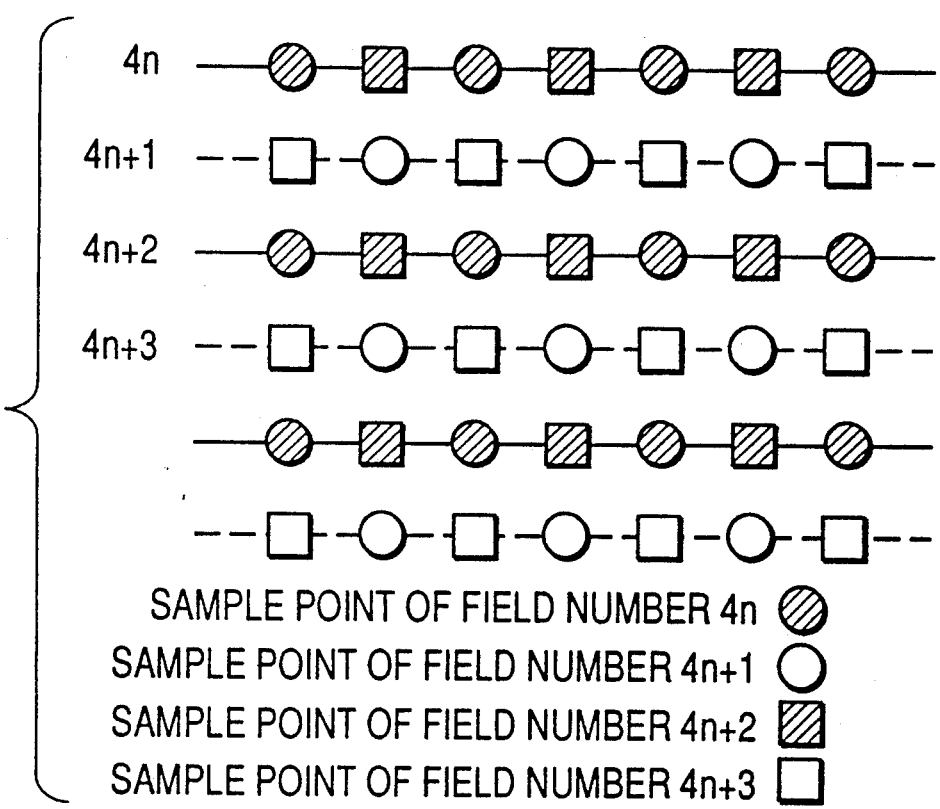
FIG. 9 is a principle diagram for explaining the band-compression method of a high definition television signal by offset sub-sampling.
Figure 10A:
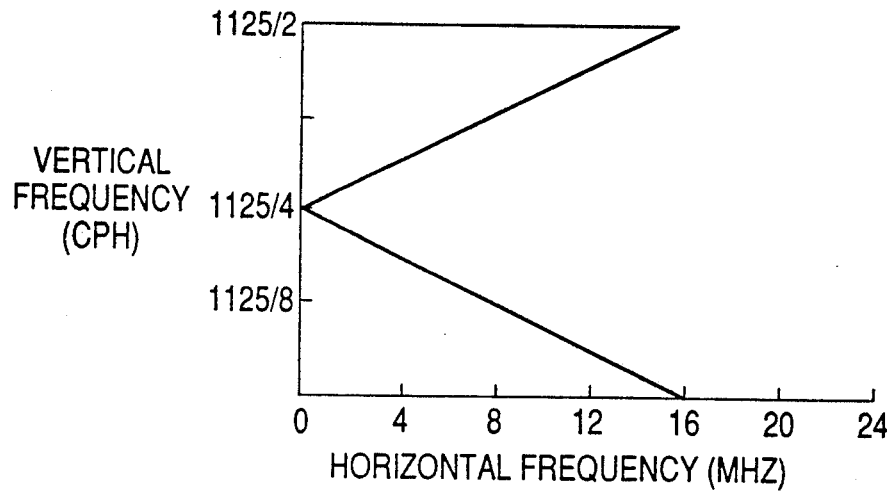
FIGS. 10(a)–10(b) are frequency characteristic diagrams for explaining the occurrence of the aliasing components derived from MUSE system offset sub-sampling in intra-field interpolation.
Figure 10B:
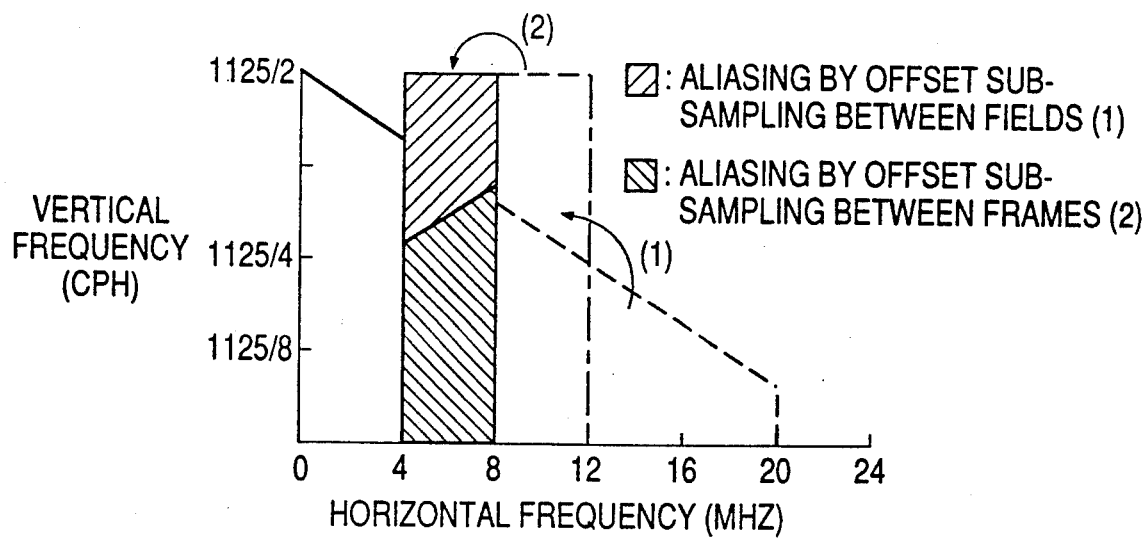

FIG. 8 is a block diagram of a constitution example of the video signal converter in another embodiment. The parts identical in purpose and operation with those shown in the embodiment in FIG. 5 are identified with the same reference numbers, and the explanations thereof have been omitted. What is different from the configuration shown in FIG. 5 is that the field memories are disposed before the interpolating circuit 41.

It is exactly the same until the MUSE signal entering the input terminal 11 is supplied into the de-emphasis filter 13 to return the nonlinear emphasis characteristics to the original state. Next, the signal is stored in two field memories 46 and 47 in cascade connection, and the non-sampling point is interpolated from the sampling points in the field with respect to the band-compressed signal in three adjacent fields in the interpolating circuits 48, 49, and 50. In the median-value selector 19 for selecting the median-value signal of the signals of the three adjacent fields and in the adder 20, by averaging the mutually correlated signals in the fields, aliasing components are removed, and the high definition television signal is converted into the conventional standard television signal in the time-axis conversion circuit 42, while the aspect ratio is converted, and it is converted into an analog signal in the D/A converter 24, and is delivered as the standard television signal from the output terminal 25.

Thus, by disposing the field memories for obtaining the signal among three adjacent fields so as to store the television signal before interpolation, the aliasing distortion due to offset sub-sampling between fields of the MUSE system may be sufficiently eliminated, and since the signal is stored before the amount of data is doubled by interpolation, the capacity of the field memories can be reduced by half.

In the foregoing embodiments, field memories are used in order to reduce the aliasing distortion due to offset sub-sampling between fields of MUSE system, but this is not limitative, and frame memories may be, for example, used in order to reduce the aliasing distortion due to offset sub-sampling between frames.

As explained herein, according to the invention, the high definition television signal band-compressed by the offset sub-sampling system can be restored by a simple configuration without leaving the aliasing distortion to convert into the conventional standard television signal, so that the high definition television signal can be reproduced in high picture quality by applying it to the television and VCR of the conventional standard system.

What is claimed is:

1. A video signal converting apparatus comprising: an interpolating circuit for interpolating a non-sampling point from sampling points in a field for restoring a high definition television signal band-compressed by offset sub-sampling; a first delay element for delaying the interpolated signal by one field period; a second delay element for delaying an output of the first delay element by one field period; a median-value selector for selecting a median-value signal from signals in three adjacent fields from the input and output of the two delay elements, and an adder for averaging the output of the first delay element and an output of the median-value selector.

2. A video signal converting apparatus of claim 1, wherein a time-axis conversion circuit for converting the number of scanning lines from the high definition television signal into a standard television signal of progressive scanning is disposed in an input stage of the interpolating circuit.

3. A video signal converting apparatus of claim 1, wherein a scanning line converting circuit for converting scanning lines of the standard television signal of progressive scanning into those of the standard television signal of interlace scanning is disposed in an output stage of the adder.

4. A video signal converting apparatus of claim 1, wherein the median-value selector compares levels of every two signals out of three input field signals, detects the median-value signal by level, and delivers the median-value signal by changing over the selector circuit depending on a result of detection.

5. A video signal converting apparatus comprising: a time-axis conversion circuit for converting a high definition television signal band-compressed by offset sub-sampling to a standard television signal of progressive scanning by changing the number of scanning lines; a first delay element for delaying the converted standard television signal by one field period; a second delay element for delaying an output of the first delay element by one field period; first, second and third interpolating circuits for interpolating non-sampling points from sampling points in a field for restoring sub-sampled signals in three adjacent fields from the input and output of the two delay elements; a median-value selector for selecting a median-value signal of signals of three adjacent fields from outputs of the three interpolating circuits, and an adder for averaging an output of the second interpolation circuit and an output of the median-value selector.

6. A video signal converting apparatus of claim 5, wherein a converting circuit for converting scanning lines of the standard television signal of progressive scanning to those of a standard television signal of interlace scanning is disposed in an output stage of the adder.

7. A video signal converting apparatus comprising: an interpolating circuit for interpolating a non-sampling point from sampling points in a field for restoring a high definition signal band-compressed by offset sub-sampling; a first delay element for delaying the interpolated signal by one field period; a second delay element for delaying an output of the first delay element by one field period; a median-value selector for selecting a median-value signal of three adjacent fields from the input and output of the two delay elements; an adder for averaging the output of the first delay element and an output of the median-value selector, and a time-axis conversion circuit for converting the number of scanning lines and aspect ratio simultaneously from an output signal of the adder to the standard television signal.

8. A video signal converting apparatus comprising: a first delay element for delaying a high definition television signal band-compressed by offset sub-sampling by one field period; a second delay element for delaying an output of the first delay element by further one field period; first second, and third interpolating circuits for interpolating non-sampling points from sampling points in a field for restoring sub-sampled signals of three adjacent fields from the input and output of the two delay elements; a median-value selector for selecting a median-value signal of the signals of the three adjacent fields from outputs of the three interpolating circuits; an adder for averaging an output of the second interpolating circuit and an output of the median-value selector, and a time-axis conversion circuit for converting the number of scanning lines and aspect ratio simultaneously from an output signal of the adder to the standard television signal.

9. A video signal converting apparatus of claim 7 wherein the time-axis conversion circuit comprises a field memory circuit for writing and reading asynchronously, a write control circuit for sampling desired video data from the high definition television signal, and a read control circuit for reading out the written video data at a rate of the standard television signal.

10. A video signal converting apparatus of claim 8, wherein the time-axis conversion circuit comprises a field memory circuit for writing and reading asynchronously, a write control circuit for sampling desired video data from the high definition television signal, and a read control circuit for reading out the written video data at a rate of the standard television signal.

* * * * *